May 24, 1955     F. J. SCHENKELBERGER     2,709,018
LOAD HANDLING EQUIPMENT FOR INDUSTRIAL TRUCKS
Filed Sept. 5, 1952     3 Sheets-Sheet 1
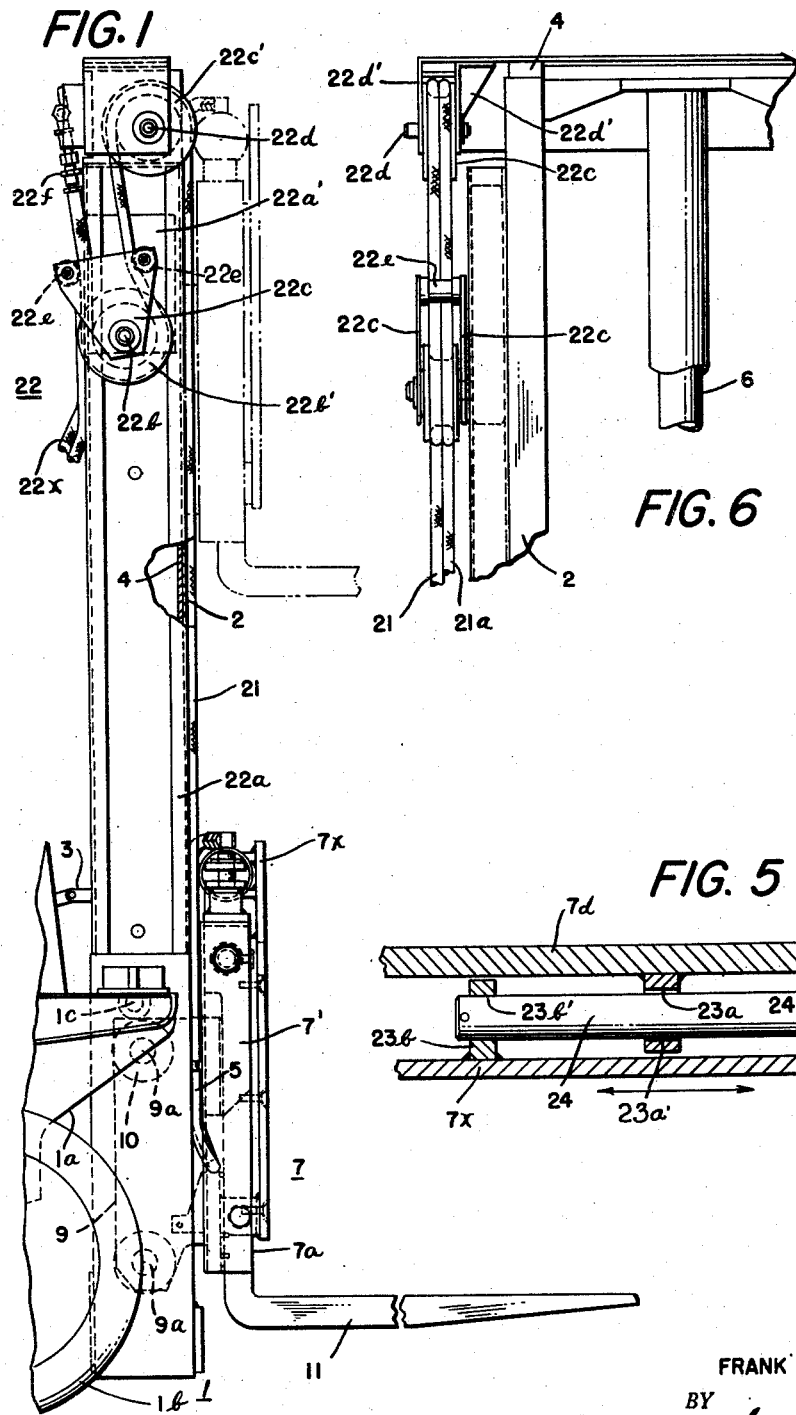
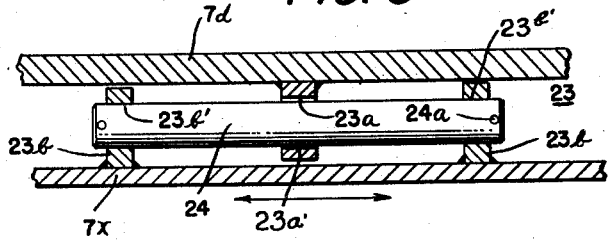
INVENTOR.
FRANK J. SCHENKELBERGER
BY
ATTORNEY INVENTOR.
FRANK J. SCHENKELBERGER
BY
Geo. B. Pitts
ATTORNEY

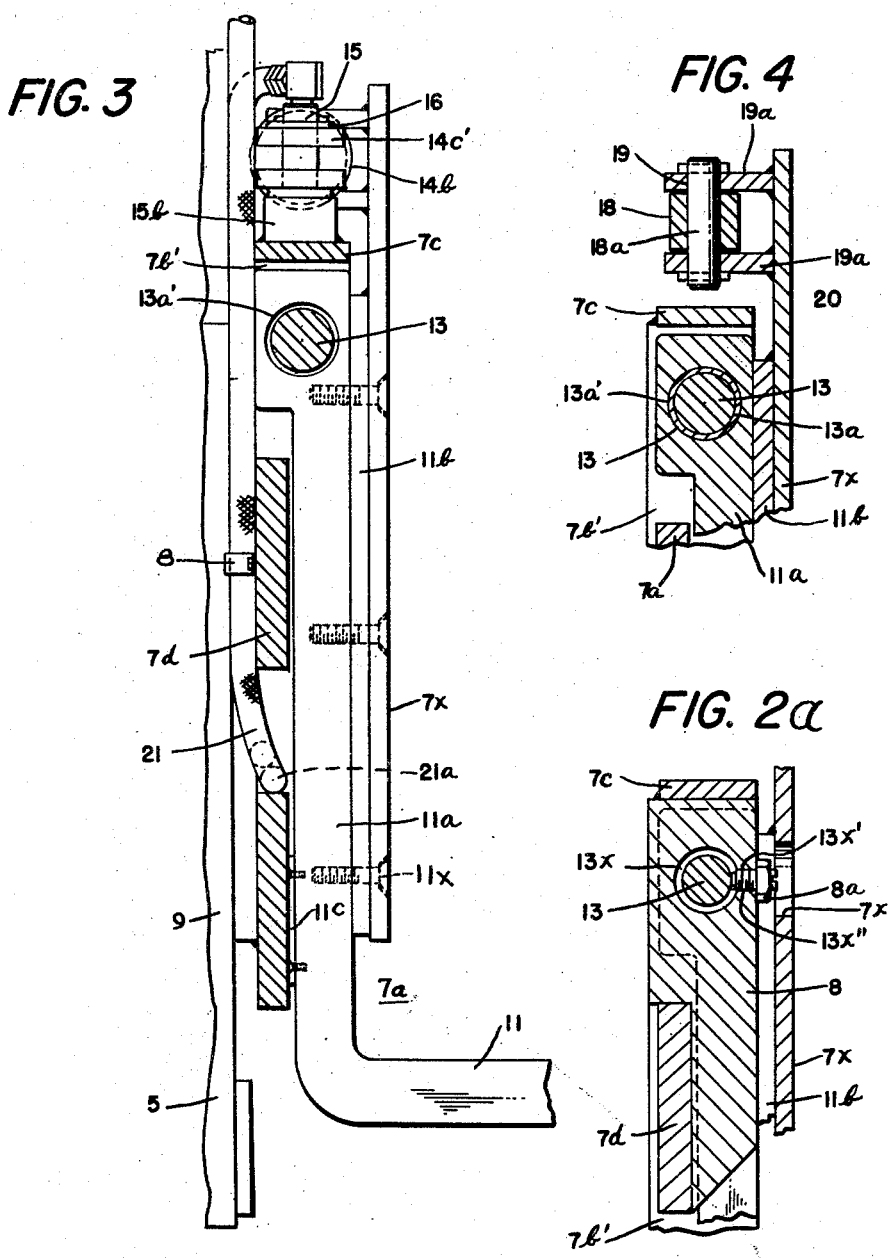

United States Patent Office 2,709,018
Patented May 24, 1955

2,709,018

LOAD HANDLING EQUIPMENT FOR INDUSTRIAL TRUCKS

Frank J. Schenkelberger, North Olmsted, Ohio, assignor to The Baker-Raulang Company, Cleveland, Ohio, a corporation of Ohio Application September 5, 1952, Serial No. 308,109

6 Claims. (Cl. 214—731)

This invention relates to load handling equipment for industrial trucks, more particularly to the load carrier which is supported on the elevating member, the latter being slidably mounted on guides and power operated to selected levels and lowered, whereby loads on the carrier may be stacked and destacked and conveyed to and discharged in specific locations, freight cars, cargo planes, trailers and other types of vehicles.

The invention includes a form of construction wherein loads may be picked up by a forward movement of the truck and discharged by a backing movement thereof; since the load support is movable laterally in either direction on the carrier frame, as later set forth, (a) the operations above referred to may be carried out where the load to be picked up or the location for discharge thereof is disalined with respect to the truck, so that the positioning and operation of the latter is greatly facilitated and (b) loads may be discharged in close relation to a wall or previously stacked loads or picked up where the loads are positioned close to a wall or stacked loads.

One object of the invention is to provide a load carrier having a transversely movable load support, the carrier and support consisting of a minimum number of parts to facilitate assembly and reduce the cost of fabrication.

Another object of the invention is to provide, in a truck, an improved carrier wherein the guide for the load support and the power means for moving the latter transversely in either direction are disposed in relatively close parallel relation, whereby friction between and wear on the guide and parts engaging therewith are reduced.

Another object of the invention is to provide, in a truck, an improved load carrier having a frame supporting a laterally shiftable load support slidably mounted on a single guide disposed adjacent the top of the frame, whereby the load support is suspended therefrom.

A further object of the invention is to so simplify the construction of the carrier that the total weight of the truck, as compared to other trucks having load carriers, is materially reduced.

Other objects of the invention will be apparent to those skilled in the art to which my invention relates from the following description taken in connection with the accompanying drawings, wherein:

Fig. 1 is a side elevation of the front end portion of an industrial truck provided with a load carrier embodying my invention;

Fig. 2a is a fragmentary section on the line 2a—2a of Fig. 2;

Figure 2:
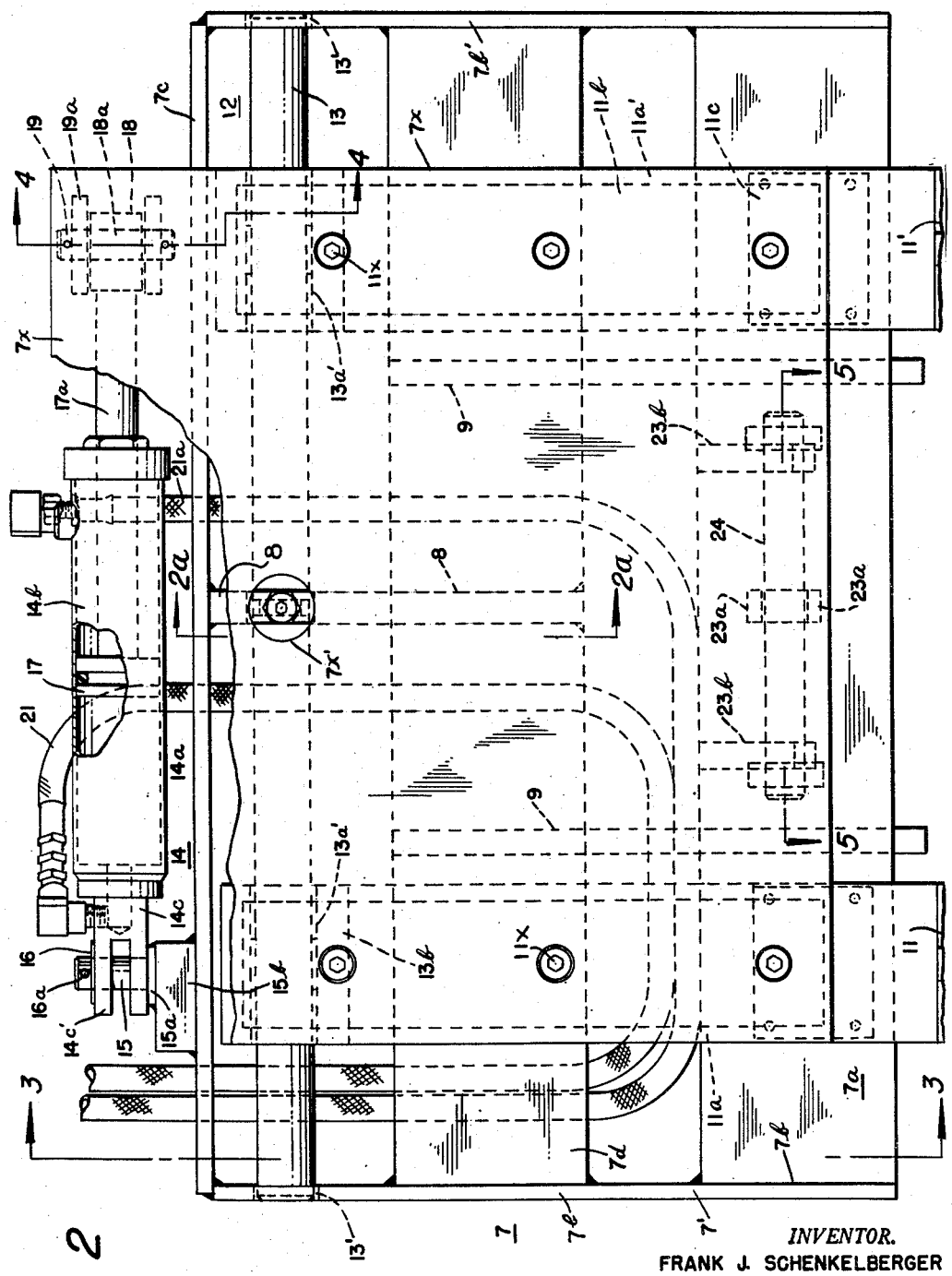
Fig. 2 is a front elevation of the carrier, parts being broken away and the truck frame and guides thereon being omitted.

Figs. 3, 4, and 5 are fragmentary sections on the lines 3—3, 4—4 and 5—5, respectively, of Fig. 2; and Fig. 6 is a fragmentary elevation substantially on the line 6—6 of Fig. 1.

In the drawings, 1 indicates as an entirety the front end portion of an industrial truck having a frame 1a mounted on a pair of front wheels 1b and a pair of rear wheels (not shown), one of said pairs of wheels being driven and the other pair of wheels being steerably mounted. The frame 1a supports a pair of outer guides 2, which are mounted on trunnions 1c, whereby, by operation of the suitable power means (not shown) arranged to operate the connections 3 between the frame 1a and guides 2, the latter and all parts supported thereon may be tilted outwardly and inwardly. The guides 2 slidably support a pair of inner or secondary guides 4, relative to which a device, indicated at 5, is moved vertically by a fluid operated mechanism 6. The mechanism 6 is operable to raise the device 5 and a load carrier, indicated as an entirety at 7, thereon, (a) independently of the guides 2, 4, to and from the upper ends thereof and to and from selected positions below the upper ends of the guides—one elevated position of the device 5 being shown in dotted lines in Fig. 1, and (b) upon reaching the upper ends of the guides to raise both the inner guides 4 and device 5 to position the carrier 7 at selected higher levels. The construction of the truck frame, mounting of the wheels therefor, the vertically movable device 5, guides for the latter and the raising mechanism 6 form no part of the present invention and may be of any desired construction and arrangement. The form of construction of the fluid operated mechanism 6 is preferably similar to that disclosed in Letters Patent No. 2,598,566 to Max Lehmann.

The carrier 7 comprises a frame 7' and a load support 7a thereon. The frame 7' consists of side walls 7b, 7b', a top wall 7c and a rear wall 7d consisting of upper and lower panels, these walls being suitably welded together and the panels being welded at their opposite ends to the side walls 7b, 7b'. The frame 7' is reinforced by a vertically disposed bar 8 welded to the top wall 7c and the upper panel of the rear wall 7d. The frame 7' may be of any desired width. The rear wall 7d is provided with rearwardly extending, parallelly related brackets 9 having laterally extending upper and lower shafts 9a supporting rollers 10, which roll on the inner guides 4 during vertical movement of the device in a well known manner.

The load support 7a, as shown herein, consists of outwardly extending, parallelly related members, such as tines or forks 11, 11', preferably integrally connected at their inners ends to upstanding legs 11a, 11a', respectively, and each mounted on the frame 7' for movement at right angles to the guides 2 as later set forth, and a connection between these parts, preferably consisting of a plate 7x suitably secured to the legs 11a, 11a', as by countersunk screws 11x seated in suitable washers. The plate 7x also forms a back for the load on the forks 11, 11'. Guide devices 12 between the legs 11a, 11a', and the frame 7' serve to slidably support the load support 7a on the frame 7' for movement laterally thereof. The guide devices 12 consist of the following: 13 indicates a guide member disposed adjacent and parallel to the top wall 7c of the frame 7' and suitably removably mounted at its opposite ends in alined openings 13' formed in the side bars 7b, 7b'. The legs 11a, 11a', adjacent their upper ends are formed with alined openings 13a, in each of which a sleeve 13a', having a presseddin fit with the walls of the opening, is mounted; as shown in Figs. 1, 2, 3 and 4, the sleeves 13a', slidably fit the guide member 13 to slidably support the load carrier 7a thereon. As the guide member 13 is disposed adjacent the top wall 7c of the frame 7' and the legs 11a, 11a', depend downwardly therefrom, the upper portion of the load support 7a is held against vibration during transportation of the load thereon, so that danger of displacement of the load is materially reduced. The guide member 13 is fixedly connected to the frame 7' by simplified means which permit ready assembly, removal and replacement thereof. As shown in Fig. 2a, the connecting means consist in forming in the reinforcing member 8 an opening 13x alined with the openings 13'. The guide member 13 extends through the opening 13x and is removably engaged by a screw threaded element 13x' (screw or bolt) threaded through a screw threaded opening 13x" formed in the reinforcing member 8, the element 13x' being locked by a nut 8a. 7x' indicates an opening formed in the back 7x to permit access to the element 13x'. I provide (a) between the back 7x and each leg 11a, 11a', a spacer 11b and (b) between each leg 11a, 11a', and the lower panel of the rear wall 7d a wear plate 11c which slidably engages the adjacent panel of the rear wall 7d (see Fig. 3) during lateral or side shifting movements of the load support 7a. In the arrangement set forth the distance from the load engaging plate 7x to the axis of the wheels 1b is reduced, as compared to other trucks of this type, of which I have knowledge, so that the counterbalancing weight required on the rearward portion of the truck frame is reduced, the effect of which is to reduce the total weight of the truck.

From the foregoing description it will be observed that the legs 11a, 11a', are connected together in spaced relation by the back 7x, so that the forks 11, 11', legs 11a, 11a' and back 7x slide and are supported on the guide member 13 as a unitary assembly, being moved laterally in either direction on the guide member 13 by a power mechanism indicated as an entirety at 14. The sleeves 13a' preferably have a length equal to the width of the legs 11a, 11a', and the latter are spaced to provide for movement of the load support 7a transversely of the frame 7' a distance in either direction to carry out the operations already referred to. The back extends at its opposite sides beyond the legs 11a, 11a', and from the forks 11, 11', upwardly beyond the top wall 7c of the frame 7' for a purpose later apparent.

The power mechanism 14 consists of the following: 14a indicates a cylinder-piston unit disposed horizontally above the frame top wall 7c. One end wall of the cylinder 14b is provided with an extension 14c terminating in spaced, horizontally disposed elements 14c'. The elements 14c' are formed with alined openings through which a vertically disposed shaft 15 extends to permit swinging movement of the cylinder 14b thereon. The lower end of the shaft 15 is welded to a pad 15a formed integrally with a base 15b, which in turn is welded to the top wall 7c of the frame 7'. A washer 16 is mounted on the shaft 15 and seated on the upper surface of the upper element 14c', the washer being engaged by a suitable device, such as a cotter pin 16a, whereby the adjacent end of the cylinder is removably supported on the pad 15a. A reciprocatable piston 17 is provided in the cylinder 14b and is connected to the inner end of a piston rod 17a, which extends through the opposite end wall of the cylinder 14b. The outer end of the rod 17a is provided with a hollow boss 18 to accommodate a vertically disposed wrist pin 18a, the opposite ends of which extend through alined openings 19 formed in the outer end portions of spaced plates 19a suitably welded on and extending inwardly from the back 7x. The wrist pin 18a is provided at the opposite outer sides of the plates 19a with cotter pins 20 to support it in position.

From the foregoing description it will be observed that one end of the cylinder 14b is connected to the frame 7' and held against endwise movement relative thereto and the outer end of the piston rod 17a is operatively connected to the back 7x, so that when fluid pressure is supplied to either end of the cylinder 14b, the piston 17 is operated in one direction to move the load support 7a transversely in the same direction.

It will be noted that the cylinder 14b is disposed in relatively close relation and parallel to the guide member 13 and that the axes of the cylinder 14b and guide member 13 are disposed in a vertical plane; also that the axes of the shaft 15 and wrist pin 18a intersect an imaginary axis of the cylinder 14b, so that in the operation of the piston 17 in either direction danger of binding effects between the related guide devices 12 are eliminated.

21, 21a, indicate fluid flow pipes connected by suitable fittings to the opposite ends of the cylinder 14b, these pipes being connected to a source of fluid supply under pressure (such as oil) and fluid discharge leading to a sump system, a valve being provided in the system adapted simultaneously to supply fluid pressure through either pipe to the adjacent end of the cylinder 14b and discharge of the fluid from the other end thereof. As shown in Fig. 2, when the load support 7a is in mid-position, the piston 17 is disposed substantially equal distances from the opposite ends of the cylinder 14b, so that fluid pressure may be supplied to either end of the latter to move the piston 17 toward one end of the cylinder and the load support 7a in the same direction, movement of the piston 17 toward the other end of the cylinder being effected by a reversal of the fluid flow through the pipes 21, 21a. It will be observed that when the load carrier is in mid-position, as shown in Fig. 2, the legs 11a, 11a', are spaced (preferably equal distances) from the frame side walls 7b, 7b', whereby the carrier may be moved laterally in either direction to facilitate load pick-up, discharging and stacking or de-stacking operations as hereinbefore referred to. The pipes 21, 21a consist of hoses which extend downwardly from the cylinder 14b and laterally to a position on the outer side of one of the guides 2 and then upwardly, being supported by a pay-out and take-up mechanism 22 to compensate for the raising and lowering movements of the elevating member 5.

In elevating trucks of the type herein shown, it is the practice to provide power means for tilting the guides 2 and all parts supported thereon outwardly and inwardly. As already set forth the load support 7a is supported on the guide devices 12 between the upper portion of the frame 7' and the upper end portions of the legs 11a, 11a', whereby the latter depend downwardly so that the forks 11, 11', on which the load rests are disposed below the guide member 13 on the frame 7'. To prevent the load support from swinging outwardly about the guide member 13, when the guides 2 are tilted outwardly or the forks engage an obstruction in the downward movement of the carrier, I provide an interlock between the back 7x and rear wall 7d of the frame 7'. For this purpose I provide a lug 23a on the outer side of the lower panel of the rear wall 7d and extending outwardly therefrom and spaced supporting elements 23b rigidly mounted on the back 7x and extending inwardly therefrom at opposite sides of the lug 23a. As shown, the lug 23a is formed with a through opening 23a' alined with through openings 23b' formed in the elements 23b. The openings 23a', 23b', accommodate a bar 24, which through its engagement with the walls of these openings prevent outward swinging movement of the load support on the guide 13 when the guides 2 are tilted outwardly. The bar 24 is held against endwise movement by pins 24a. The interlocking elements also prevent outward swinging movement of the load support in the event, in the gravitational movement of the carrier downwardly, the forks 11, 11a', meet with an obstruction in the path of movement of the latter, whereby further downward movement of the carrier is arrested.

The mechanism 22 consists of the following: 22a indicates an elongated guide preferably of channel shape in cross section and suitably fixed to and extending along the outer side of the adjacent main guide 2. 22a' indicates a weight slidably fitting the inner walls of the guide 22a and adapted to counter-balance certain movable parts of the mechanism 22. The lower end portion of the weight 22' is formed with a transverse opening in which the inner end portion of a shaft 22b is mounted; the outer end portion of the shaft supports a pulley 22b' between a pair of plates 22c. 22c' indicates a pulley disposed above and in alinement with the pulley 22b' and rotatable on a shaft 22d suitably supported at its opposite ends on spaced brackets 22d' carried by the adjacent guide 4. As shown in Fig. 6, the pulleys 22b', 22c', are provided with side-by-side peripheral grooves to accommodate the hoses 21, 21a. As shown in Fig. 1, when the elevating member 5 is in its low or normal position, the hoses 21, 21a, extend upwardly around the pulley 22c', then downwardly between the guide elements 22e and around the pulley 22b' and then upwardly, the outer ends of the hoses 21, 21a, being connected to suitable fittings 22f, preferably supported on a cross member for the guides 2, the fittings 22f in turn being connected by pipes or hoses 22x to the valve for controlling the supply of fluid pressure to and discharge of fluid from the cylinder 14b, as already set forth. In operation, when the elevating member 5 is raised relative to the guides 4 the hoses reeve around the pulleys 22b', 22c', and the weight 22a' gravitates downwardly to take up slack in the hoses; when the guides 4 are moved upwardly to raise the carrier 7 to a higher level, the weight is moved upwardly and the hoses reeve around the pulleys 22b', 22c', to pay out the hoses. In the downward movement of the guides 4 and the elevating member, the hoses reeve around the pulleys 22b', 22c', in the opposite direction and the weight moves in reverse directions. No claim is made herein to the take-up and pay-out mechanism, as I believe such mechanism to be the invention of Charles F. Overbeck, of Lakewood, Ohio.

What I claim is:

1. A load carrier of the character described comprising a frame assembly adapted to be operatively connected to the elevating mechanism of an industrial lift truck and be raised and lowered thereby, said frame assembly having a top wall and side walls depending from said top wall, a guide member disposed adjacent to and parallel with the underside of said top wall and fixedly connected to said side walls, a load support assembly comprising a load lifting member having an upwardly extending portion slidably connected to said guide member, and fluid pressure actuated power means connected to said frame assembly and to said load support assembly for moving said load support assembly along said guide member relative to said frame assembly, said power means comprising a cylinder mounted on said frame assembly in parallel relation to said guide member and a reciprocal piston in said cylinder connected to one end of a piston rod the other end of which is connected to said upwardly extending portion of said load support assembly, opposite ends of said cylinder being adapted for connection with a supply of fluid under pressure and with a fluid discharge system.

2. A load carrier of the character described comprising a frame assembly adapted to be operatively connected to the elevating mechanism of an industrial lift truck and be raised and lowered thereby, said frame assembly having a top wall and side walls depending from said top wall, a guide member disposed adjacent to and parallel with the underside of said top wall and fixedly connected to said side walls, a load support assembly comprising a plurality of load lifting tine members each having an upwardly extending portion slidably connected to said guide member, a vertically disposed plate-like member fixedly secured to the outer or front sides of said upwardly extending portions of said load-lifting tine members for connecting the latter together in spaced relation, said plate-like member extending above said top wall of said frame assembly, and fluid pressure operated power means connected to the upper side of said top wall and to said vertically disposed plate-like member for moving said load support assembly along said guide member relative to said frame assembly.

3. A load carrier as claimed in claim 2 wherein said power means consist of a cylinder mounted on said top wall in parallel relation to said guide member, and a reciprocatable piston in said cylinder connected to one end of a piston rod the outer end of which is connected to said vertically disposed plate-like member, the opposite ends of said cylinder having fluid connections adapted for connection with a supply of fluid under pressure and fluid discharge system provided with a valve for controlling the fluid supply and discharge through said connections.

4. A load carrier as claimed in claim 2 wherein said frame assembly is provided with a member forming a rear wall and relatively movable connections are provided between said plate-like member and said rear wall for preventing outward swinging of said load support assembly in the event the latter engages an obstruction during lowering of said load support assembly and downward movement thereof arrested.

5. A load carrier as claimed in claim 2 and comprising a lug on one of said assemblies and a horizontally disposed member in the other of said assemblies and having sliding interlocking engagement with said lug, said lug and said horizontally disposed member being located below said guide member whereby outward swinging of said load support assembly is prevented in the event the load support assembly engages an obstruction during lowering of said load support assembly and downward movement thereof arrested.

6. A load carrier adapted to be raised and lowered by the elevating member of a truck, comprising a frame adapted to be mounted on the elevating member and having a top wall and side walls depending from said top wall and a rear wall, a guide disposed adjacent and parallel to said top wall and fixedly related to said frame, a load carrying device consisting of a pair of load supports each having an upwardly extending member and a vertical wall disposed parallel and fixedly secured to the outer sides of said upwardly extending members and connecting the latter together in spaced relation, the upper end portions of said upwardly extending members being slidable on said guide and suspended downwardly therefrom, power means mounted on said top wall, one element of said power means being connected to said last-mentioned wall for moving said load carrying device relative to said frame, a lug on said rear wall, and a horizontally disposed member fixed to the inside of said vertical wall and having sliding interlocking engagement with said lug for preventing outward swinging of said load carrying device in the event the latter engages an obstruction during lowering of said device, whereby downward movement of said device is arrested.

References Cited in the file of this patent

UNITED STATES PATENTS

| | | |
|---|---|---|
| 2,270,664 | Weaver | Jan. 20, 1942 |
| 2,360,407 | Dunham et al. | Oct. 17, 1944 |
| 2,432,411 | Guerin et al. | Dec. 9, 1947 |
| 2,456,320 | Repke | Dec. 14, 1948 |
| 2,483,534 | Frischmann et al. | Oct. 4, 1949 |
| 2,598,566 | Lehmann | May 27, 1952 |
| 2,605,918 | Roscoe | Aug. 5, 1952 |
| 2,608,315 | Turner | Aug. 26, 1952 |
| 2,622,751 | Shaffer | Dec. 23, 1952 |
| 2,650,732 | Hartquist | Sept. 1, 1953 |